(No Model.) 2 Sheets—Sheet 1.
J. LOHGES.
IMPLEMENT FOR EXPANDING AND CUTTING BOILER TUBES.
No. 270,446. Patented Jan. 9, 1883.
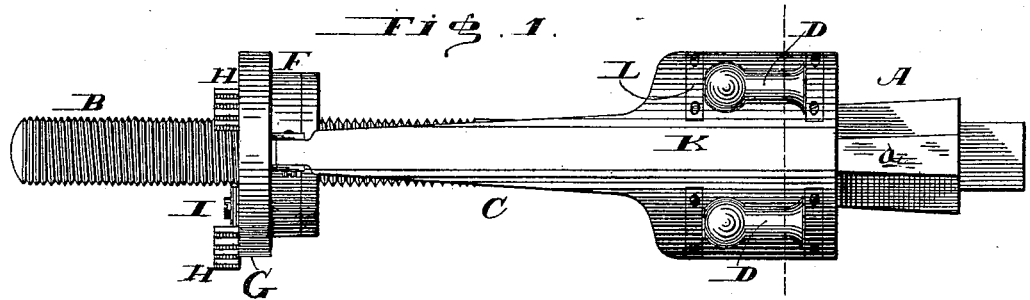
Fig. 1.
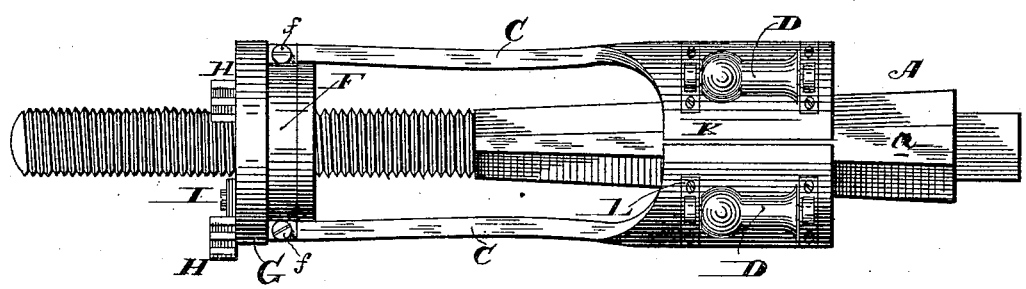
Fig. 2.
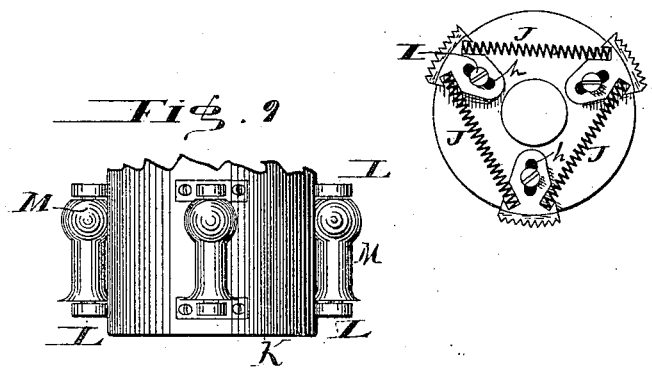
Fig. 3.
Fig. 9.
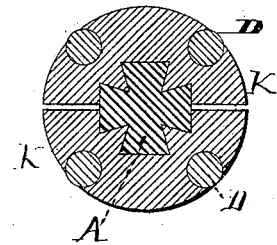
Fig. 10.
Witnesses:
C. J. Belt
M. Tanner
Inventor.
John Lohges
By Paine & Ladd
Attorneys.

(No Model.) 2 Sheets—Sheet 2.
J. LOHGES.
IMPLEMENT FOR EXPANDING AND CUTTING BOILER TUBES.
No. 270,446. Patented Jan. 9, 1883.
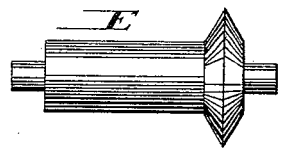
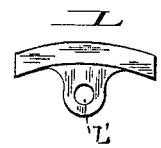
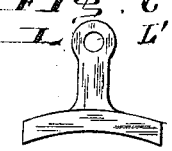
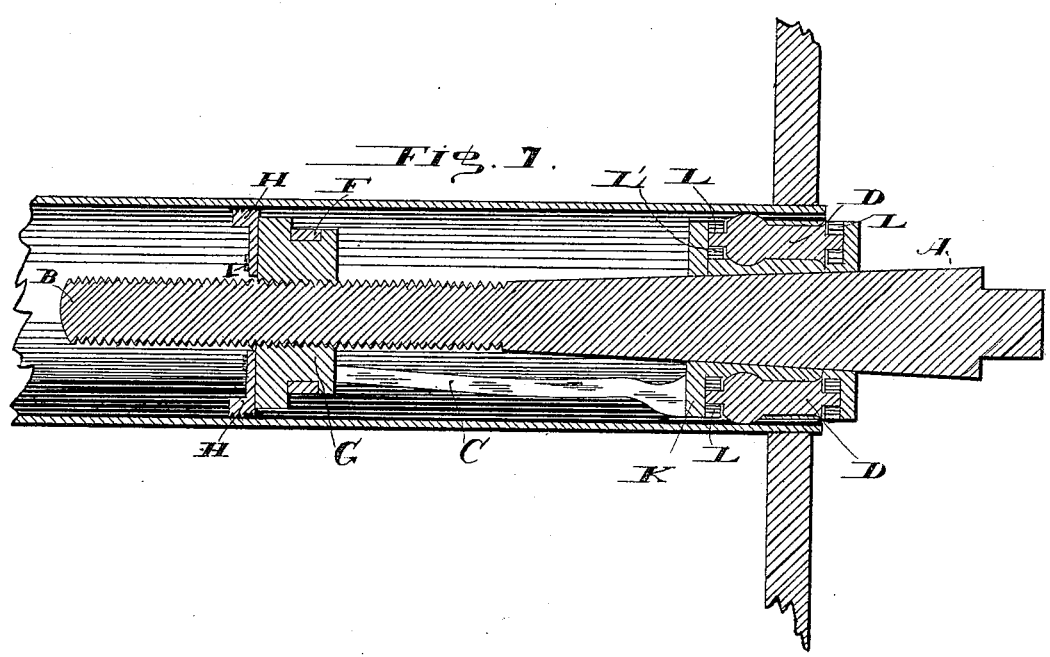
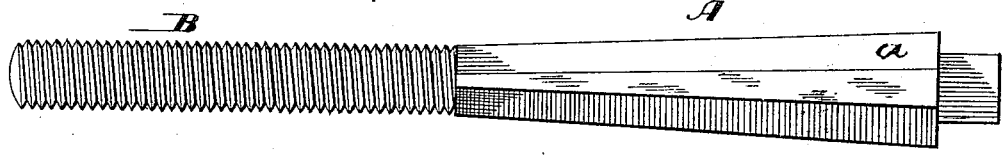
Witnesses:
C. J. Belt
M. Tanner
Inventor.
John Lohges
by Paine & Ladd
Attorneys.

UNITED STATES PATENT OFFICE.

JOHN LOHGES, OF ALGIERS, LOUISIANA.

IMPLEMENT FOR EXPANDING AND CUTTING BOILER-TUBES.

SPECIFICATION forming part of Letters Patent No. 270,446, dated January 9, 1883.

Application filed November 13, 1882. (No model.)

*To all whom it may concern:*

Be it known that I, JOHN LOHGES, a citizen of the United States, residing at Algiers, in the parish of Orleans and State of Louisiana, have invented certain new and useful Improvements in Implements for Expanding and Cutting Boiler-Tubes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to that class of boiler-tube expanders and cutters in which a tapering screw-threaded mandrel turning in a nut fixed temporarily within the boiler-tube serves to operate a series of expanding or cutting rollers.

The object of my invention is to provide an implement which combines simplicity of construction with ease of operation, and can be employed for expanding or cutting tubes of varying diameters.

To these ends the invention consists in the construction and combination of parts, which will hereinafter be more fully described, and then set forth in the claims.

In the accompanying drawings, Figure 1 is a side view of a tube-expander embodying my improvements. Fig. 2 is a similar view, showing it adapted for use upon large tubes. Fig. 3 is a face view of the screw-nut with its spring-pressed cams. Fig. 4 is a detail view of a roller-cutter used in place of the expanding-roller. Figs. 5 and 6 are detail views of the removable bearings for the various rollers. Fig. 7 is a sectional view, showing the implement in position for expanding a boiler-tube. Fig. 8 is a detail view of the screw having an angular smooth-faced mandrel. Fig. 9 is a plan view of a portion of the pivoted jaws, provided with roller-carriers projecting beyond the peripheries of said jaws. Fig. 10 is a transverse section of such jaws, having expanding-rollers fitted in seats made therein.

The letter A designates a mandrel, which is made tapering and angular in cross-section, and is provided with a cylindrical screw-stem or front portion, B. The mandrel gradually tapers from a rear shank or enlargement, $a$, to the screw-threaded portion, so that when fed forward in the boiler-tube it will gradually spread a pair of hinged arms, C, carrying the expanding-rollers D or the cutting-rollers E. These arms C are hinged at their front ends to a ring or collar, F, which encircles a tubular nut, G, and is permitted to turn thereon when the mandrel is rotated. This nut G has a front face-plate and a smaller rear plate, between which is left a neck or cylindrical portion on which the collar F turns. This collar is obviously split or made in two parts, so that it can be applied between said plates, and it has ears or lugs between which the arms are held by the pivot-screws $f$. The interior of the nut is screw-threaded, so as to receive the screw portion of the mandrel. To the front of the face-plate of the nut are applied several serrated cams, H, the function of which is to hold the nut stationary within the boiler-tube by causing said cams to project beyond the periphery of the nut and bite against the interior surface of the flue. The cams are provided with slotted shanks $h$, through which pass retaining-screws I, that enter the face-plate of the nut and serve to hold said cams in position. Spiral springs J are arranged on the nut between the shanks of the cams, and are connected therewith in a detachable manner. The object of these springs is to press the cams outward and hold them in firm contact with the boiler-tube. The free ends of the hinged arms C terminate in semicircular jaws or frames K, which, when fitted together, present a cylindrical body, through which the angular mandrel is free to slide when the screw is turned in the stationary nut in the tube. The bore of this body, formed by the jaws or frames K, is of a shape or configuration conforming with the angular shape of the mandrel. In this manner it will be perceived the jaws K are turned or carried around by the mandrel, whenever the latter is rotated, without interfering with the free forward movement of the screw. The semicircular or curved peripheries of the jaws K are recessed or provided with seats for the reception of attachable and removable roller-carriers or bearing-blocks L.

The carrier shown in Fig. 5 is designed for use with an implement adapted for expanding or cutting small tubes, as shown in Fig. 1, in which instance the carriers do not project above the peripheries of said jaws.

Fig. 6 illustrates a carrier having a neck between its base and head, so as to raise the latter beyond the peripheries of the jaws. The rollers M, fitted in the carriers by means of suitable gudgeons on the former and holes L' in the latter, are provided with a bulging inner end, which serves to form the necessary bulge or expanded portion in the tube adjoining the flue-sheet or boiler-head. The other end of the roller flares outward, so that it will serve to swage or press the end of the tube upon the outer face of the boiler-head.

The construction shown in Fig. 2 involves the use of the elongated carriers shown in Fig. 6, so as to adapt the implement for use upon boiler tubes of larger diameter than could be expanded or cut by the implement shown in Fig. 1.

It will be obvious that the serrated cams are also made longer than in the implement used for small tubes. The springs and screws, however, are used with both the short and long cams.

When the implement is to be used for cutting boiler-tubes the expanding-rollers are removed from their carriers and the roller-cutters O (shown in Fig. 4) substituted therefor. These cutters consist of a cylindrical body carrying an end disk or circular cutter. The gudgeons on the roller-cutter are fitted in the carriers in the same manner as with the expanding-rollers.

Having thus described my invention, what I claim as new, and desire to secure by Letters Patent, is—

1. In an implement for expanding or cutting boiler-tubes, the combination of the turn collar or ring, and roller-carrying arms hinged thereto, with a stationary nut encircled by said collar, and a mandrel having a screw portion turning in said nut, and a tapering portion adapted to spread said hinged arms, as and for the purpose set forth.

2. The combination of the detachable roller-carriers with the adjustable arms having recessed jaws or heads, the expanding or cutting rollers, and the screw-mandrel for adjusting the arms carrying the rollers, as and for the purpose herein set forth.

3. The combination of the movable serrated cams, pressure-springs, and retaining-screws with the stationary nut, turn-collar, hinged arms, rollers mounted thereon, and rotating mandrel, as and for the purpose set forth.

In testimony whereof I affix my signature in presence of two witnesses.

JOHN LOHGES.

Witnesses:
JAMES SONMERS,
BUS. POWERS.